Aug. 1, 1939.                 J. A. LIGNIAN                 2,168,227
              METHOD OF SIZING POROUS METAL BEARINGS
                      Filed Oct. 29, 1937

INVENTOR
Jean A. Lignian
BY
Spencer Hardman & Fehr
his ATTORNEYS

Patented Aug. 1, 1939

2,168,227

UNITED STATES PATENT OFFICE 2,168,227

METHOD OF SIZING POROUS METAL BEARINGS

Jean A. Lignian, Dayton, Ohio, assignor to General Motors Corporation, Detroit, Mich., a corporation of Delaware Application October 29, 1937, Serial No. 171,657

8 Claims. (Cl. 29—149.5)

This invention relates to flanged shaft bearings and more particularly to sizing porous metal flanged bearings concomitantly as they are pressed into receiving recesses in machine frames.

Porous metal bearings or bushings, made by a process such as is described in U. S. Patent No. 1,556,658 to Williams, are not easily adapted to machining since machining the same at the inner surface thereof, burnishes the surface and thereby closes the pores to destroy the porosity and prevent self-lubrication at the inner surface when the bearing is in use and is impregnated with oil. It is a common practice to fabricate porous metal bearings, such as porous bronze bearings, in an over-sized condition whereby they may be pressed into a receiving recess of reduced size and thereby sized while being seated in the recess. This sizing operation is possible since the porous metal bearing due to its ductility and compressibility is deformed radially inwardly as it is introduced into the receiving recess and thereby sized about a mandrel.

In flanged bearings there is a distinct problem of "bell-mouthing" or flaring at the flanged end thereof when this flange is not pressed within a receiving recess, this type of bearing being common as an end thrust bearing or the like. Such a condition arises due to the fact that the radial inward pressure against the gearing when being pressed within the constricted bore of the receiving support, causes the bearing to be compressed radially inwardly, whereas the flanged end thereof is not so constricted and therefore is bell-mouthed when the bearing is seated within the recess. Where bearings of this type are used and the bearing is limited in length, due to conditions of use, the bell-mouthed end of the bearing considerably reduces the available bearing surface and therefore is very undesirable.

The present invention solves this problem and prevents bell-mouthing at the flanged end of the bearing whereby substantially the entire length of the bearing bore is available as a bearing surface.

One of the objects of the present invention is to provide a method of sizing and seating a flanged bearing in a receiving recess of a bearing support, by first assembling the bearing on a sizing mandrel, then introducing the bearing into a receiving recess by applying peripheral pressure on a small area at the flanged end and adjacent the bore thereof to substantially deform the bearing radially inwardly around the sizing mandrel at the flanged end, and then increasing the area of pressure on said flanged end to further size and seat the bearing in the receiving recess. In carrying out the above object, in some instances, a sizing mandrel having two shouldered portions is utilized. One of said shoulders being of very slight thickness and relatively smaller in diameter than the other shoulder and so disposed as to engage the flange when the initial pressure is applied thereto; the first shoulder causing the deforming action by embedding itself in the flanged end of the bearing. After the first shoulder is embedded, the second shoulder engages the flanged end of the bearing and thereby reduces the loading pressure per unit area on the flanged end of the bearing and prevents further distortion.

It is a further object to provide a method for sizing and seating porous metal bearings within receiving recesses of bearing supports whereby burnishing within the bearing bore is substantially eliminated.

It is still a further object to provide a method for sizing and seating flanged porous metal bearings within a receiving recess whereby bell-mouthing of the bearing bore is eliminated.

Other and further objects and advantages of the present invention will be apparent from the following description, reference being had to the accompanying drawing wherein a preferred embodiment of the present invention is clearly shown.

Figure 1:
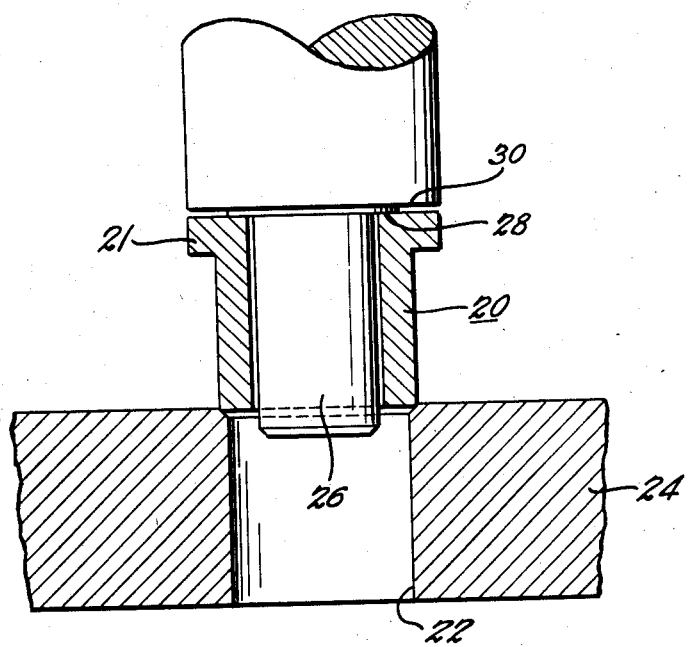
Fig. 1 represents an enlarged fragmentary view, partly in section, showing a flanged bearing assembled upon a sizing mandrel just prior to the entry of the bearing into the receiving recess of a bearing support.

Referring to the drawing, 20 indicates a flanged porous bronze bearing having an outside diameter greater than the diameter of a receiving recess 22 in a bearing support 24. The inside diameter or bore of the bearing 20 is greater than the diameter of a sizing mandrel 26 which is shown assembled to the bearing 20, the diameter of the mandrel 26 being substantially equal to the desired diameter of the bearing bore. Mandrel 26, includes a shoulder 28 of somewhat greater diameter than the over-sized bore of the bearing 20. Shoulder 28 is very thin and bears upon the bearing flange 21 adjacent the bore and around the periphery thereof. It has been found that satisfactory results are obtained when the thickness of the shoulder 28 is between .003" and .007"

and the diameter thereof is 1 1/8" when used in connection with an unsized bearing having a flange diameter of approximately 1¼ inches, and an outside diameter of one inch and a bore diameter of ⅝". The thickness of the shoulder 28 is increased according to increases in bearing dimensions. Such changes in dimensions being preferably arrived at by experimental tests. The mandrel 26 carries a second shoulder 30 of relatively greater diameter than the shoulder 28. The shoulder 30, as shown in the drawing, is approximately the same diameter as the flange of the bearing 20, but it is apparent that this diameter can be increased or decreased within reasonable limits.

In operation, the mandrel 26 with the bearing 20 assembled thereon is moved relative to the bearing support 24 and the bearing 20 is forced into the bore 22, which bore is preferably chamfered at the end thereof to facilitate the entry of the bearing. Since the diameter of bore 22 is slightly less than the diameter of the bearing 20, the bearing is necessarily compressed or deformed radially inwardly around the mandrel 26 as the bearing 20 enters the bore 22. This deformation continues progressively as the bearing is forced into the bore. After a substantial length of the bearing has been forced within the bore the pressure at the flanged end thereof becomes so great per unit area that the shoulder 28 is pressed or embedded into the bearing material of the flange. This action causes a deformation of the bearing at the flanged end thereof radially inwardly about the mandrel. Simultaneously with the embedding of shoulder 28, the shoulder 30 abuts the flanged end 21 of the bearing 20. This engagement results in a decrease in load pressure per unit area or stated inversely an increase in the area upon which the load is impressed. Further movement of the mandrel seats the bearing 20 within the bore 22 with the flange 21 resting against the surface of the support 24. Simultaneously with the seating operation, the bearing is further sized while the main bearing surface is rendered smooth without burnishing.

Due to the ductility of the bearing material, when operating on a porous metal bearing, the mandrel may be withdrawn from the bearing 20 after the same is sized without causing any substantial burnishing action within the bore thereof. Thus the bearing 20 has been inserted within the bore 22, the flange 21 seated against the support 24, and the bearing 20 sized to the diameter of the mandrel 26 without any substantial burnishing action at the inner surface thereof.

It is apparent that if the shoulder 28 were not provided that the bearing 20 would be deformed radially inwardly about the mandrel 26 except for the portion of the bore corresponding to the thickness of the flange 21. By the use of shoulder 28, the portion of the bore corresponding to the thickness of the flange 21 is deformed and thereby sized as efficiently as the remainder of the bearing bore.

The present method is highly desirable in pressing thrust bushings or flanged bearings into a recess within a support and simultaneously sizing the bearing wherein, due to the construction of the machine with which the bearing is to be used the length of the bearing is limited. Under these conditions it is often necessary to have the full length of the bearing bore available as a bearing surface. Obviously if the bearing were bell-mouthed or oversized for a substantial length at one end thereof the bearing surface would be materially reduced.

Figure 2:
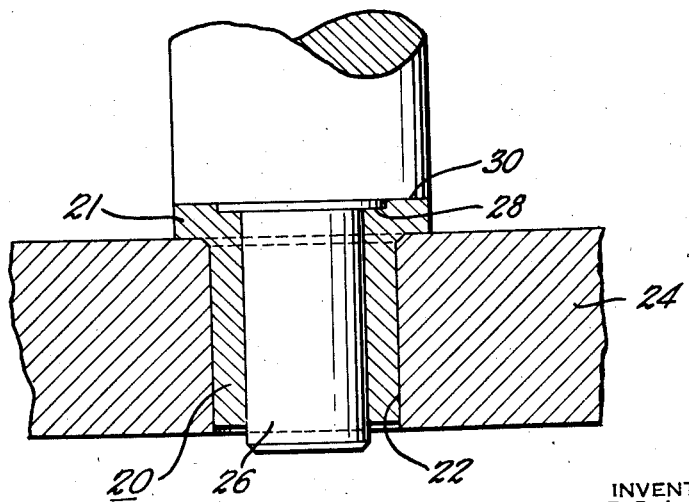
Fig. 2 is a view similar to Fig. 1 wherein the bearing has been sized and seated in the receiving recess.

Fig. 2 shows the bearing in its seated position wherein the bearing is completely sized. It is apparent by reference to Fig. 2 that the only loss of bearing surface occasioned by the present method is the few thousandths of an inch corresponding to the thickness of the shoulder 28. The present method may be carried out by using different types of mandrels than that shown in the drawing, such as a stationary mandrel in conjunction with a hollow punch which would carry the aforementioned shoulder. It should be understood that the present invention comprehends the application of peripheral pressure on a small area adjacent the bearing bore and a progressive increase in the pressure applying area as the bearing is sized and seated. It is apparent that this objective can be carried out in many other ways than that shown in the drawing and the invention is of sufficiently broad scope to embrace such modifications.

The present invention is not limited to use with porous bronze bearings but can be used successfully with any porous metal bearing that is fabricated from sufficiently ductile material to be sized in the manner described.

While the embodiment of the present invention as herein disclosed, constitutes a preferred form, it is to be understood that other forms might be adopted, all coming within the scope of the claims which follow.

What is claimed is as follows:

1. The method of providing a cylindrical recess of a bearing support with a lining of porous bearing material including an end thrust flange which is not confined by said recess, which consists in forming an end thrust bearing of outside diameter greater than the diameter of said recess and of inside diameter greater than is necessary for proper running clearance for the shaft journal which is to receive the bearing; in assembling the bearing upon a sizing mandrel having a diameter substantially equal to the diameter of the shaft journal, said mandrel having one shoulder thereon of slightly greater diameter than the inside of the bearing and of relatively slight thickness compared to the thickness of the flange and a second shoulder of relatively greater diameter than the diameter of said first shoulder; in producing relative movement between the bearing support and assembled bearing and mandrel and thereby pressing the bearing into the recess due to pressure of the first mentioned shoulder of the mandrel upon a relatively small area of said bearing flange until the unit loading pressure is sufficient to embed the relatively thin shoulder into the bearing material and distort the bearing and reduce the inside diameter of the flanged end thereof substantially to the diameter of the mandrel; and in continuing to press the bearing into said recess by engagement of the second shoulder upon said flanged surface in order to seat the flanged bearing in said recess and reduce the remainder of the inside diameter of said bearing to substantially the diameter of said mandrel.

2. The method of sizing a flanged bearing fabricated from porous metal in which the flanged portion is unconfined while inserting the remainder of the bearing into a receiving recess of a bearing support which comprises, forming a flanged bearing having an inside diameter greater than the inside diameter required and an outside diameter greater than the diameter of said recess; assembling the bearing upon a shouldered sizing mandrel having a diameter equal to the desired inside diameter of said bearing; causing the shoulder portion of the mandrel to bear on said flange and to move relative to the bearing support for introducing the bearing into the recess; progressively causing said shouldered mandrel to bear on the increasing areas of said bearing flange for progressively reducing the inside diameter of said bearing simultaneously at either end thereof while the bearing is being seated in said recess and the inside diameter of the bearing is being reduced to substantially the same diameter as the mandrel.

3. A method of sizing a flanged porous metal bushing in which the flanged portion thereof is unconfined while pressing the remainder of the bushing into a receiving recess in a bushing support which comprises, forming a flanged bushing having an inside diameter greater than that desired and an outside diameter greater than the diameter of the recess; assembling said bushing upon a shouldered sizing mandrel having a diameter equal to the desired inside diameter of the bushing; causing the shouldered portion of the mandrel to move relative to the bushing support and to progressively bear on increasing areas of said flanged end surface of said bushing for progressively reducing the inside diameter of the bushing radially inwardly to the diameter of the sizing mandrel and simultaneously seating the bushing within said recess.

4. The method of sizing an oversize porous metal flanged bushing and concomitantly seating the unflanged portion only of said bushing in a receiving recess of a bushing support which comprises, the steps of assembling the oversized bushing on a sizing mandrel having the desired diameter, applying pressure on a relatively small area of the bushing at the flanged end thereof and adjacent the bore and thereby force the bushing into the receiving recess and deform the bushing radially inwardly about said mandrel; and then increasing the area of the pressure to seat the bushing and thereby further size the same.

5. A method of sizing an oversize porous metal flanged bushing without causing burnishing at the inner surface thereof and concomitantly seating the unflanged portion only of said bushing in a receiving recess of a bushing support which comprises, the steps of assembling the porous metal bushing on a sizing mandrel, applying such pressure on a relatively small area only adjacent the bore of the bushing and at the flanged end thereof as to force the bushing into the receiving recess and thereby cause the bushing to be deformed radially inwardly about the mandrel, and progressively reducing the loading pressure per unit area as the bushing is deformed radially inwardly about the mandrel until such time as the bushing is seated in said recess, and then removing the assembled bushing and bushing support from said mandrel.

6. The method of sizing an oversize porous metal flanged bushing without causing burnishing at the inner surface thereof and concomitantly seating the bushing in a receiving recess of a bushing support wherein the flanged end of the bushing is not confined within the recess which comprises, the steps of assembling the bushing upon a sizing mandrel of the desired diameter; applying such pressure on a relatively small area adjacent the bore of the bushing at the flanged end thereof as to force the bushing into the receiving recess and thereby cause the bushing to be deformed radially inwardly at the flanged end thereof around said mandrel and simultaneously deformed at the opposite end of the bushing which is being forced into the receiving recess around said mandrel; and then increasing the area of pressure application against said flange to further size the bushing and to completely seat the same in said recess.

7. The method of sizing an oversize porous metal flanged bushing without causing burnishing at the inner surface thereof and concomitantly seating the bushing in a receiving recess of a bushing support wherein the flanged end of the bushing is not confined within the recess which comprises the steps of assembling the bushing upon a sizing mandrel of the desired diameter; applying such pressure on a relatively small area adjacent the bore of the bushing at the flanged end thereof as to force the bushing into the receiving recess and thereby cause the bushing to be deformed radially inwardly at the flanged end thereof around said mandrel, and simultaneously deformed at the opposite end of the bushing which is being forced into the receiving recess around said mandrel; and then increasing the area of pressure application against said flange to further size the bushing and to seat the same in said recess, and then removing the mandrel from the bushing.

8. The method of sizing an oversized porous metal flanged bushing and concomitantly seating the unflanged portion only thereof in a receiving recess of a bushing support, comprising; assembling an oversized bushing upon a sizing mandrel of the desired diameter, applying pressure to a small area at the flanged end of said bushing and adjacent the periphery of the bore thereof for deforming the bushing radially inwardly at the flanged end thereof while simultaneously forcing the bushing into said recess and thereby deforming the bushing radially inwardly at the other end thereof, and then applying pressure to a greater area of said flanged surface to completely size the bushing and seat the same in said recess.

JEAN A. LIGNIAN.